US009609609B2

(12) United States Patent
Deck et al.

(10) Patent No.: US 9,609,609 B2
(45) Date of Patent: Mar. 28, 2017

(54) UPDATING DATA OF A CONTROLLER OF A PRIMARY DEVICE OF A POWER SUBSTATION

(71) Applicant: ABB Technology AG, Zürich (CH)

(72) Inventors: Bernhard Deck, Weilheim (DE); Thomas Küng, Nussbaumen (CH)

(73) Assignee: ABB Schweiz AG (CH)

( * ) Notice: Subject to any disclaimer, the term of this patent is extended or adjusted under 35 U.S.C. 154(b) by 204 days.

(21) Appl. No.: 14/449,512

(22) Filed: Aug. 1, 2014

(65) Prior Publication Data

US 2014/0341209 A1 Nov. 20, 2014

Related U.S. Application Data

(63) Continuation of application No. PCT/EP2012/051695, filed on Feb. 1, 2012.

(51) Int. Cl.
| | |
|---|---|
| *H04L 12/06* | (2006.01) |
| *H04W 56/00* | (2009.01) |
| *H04J 3/16* | (2006.01) |
| *H04Q 9/00* | (2006.01) |
| *H04J 3/06* | (2006.01) |

(52) U.S. Cl.
CPC ....... *H04W 56/0015* (2013.01); *H04J 3/0602* (2013.01); *H04J 3/1688* (2013.01); *H04Q 9/00* (2013.01)

(58) Field of Classification Search
CPC ... H04J 3/0602; H04J 3/688; H04W 56/0015; H04W 56/00; H04Q 9/00
USPC .......................................................... 370/350
See application file for complete search history.

(56) References Cited

U.S. PATENT DOCUMENTS

| | | | | |
|---|---|---|---|---|
| 2011/0152769 A1* | 6/2011 | Ramey | .............. | A61M 5/14244 604/151 |
| 2011/0161022 A1* | 6/2011 | Caird | .................... | G01R 29/18 702/62 |
| 2011/0264289 A1* | 10/2011 | Sawyer | ............. | H01L 31/02021 700/287 |
| 2011/0274149 A1* | 11/2011 | Xu | ........................ | H04J 3/0638 375/222 |

OTHER PUBLICATIONS

International Search Report (PCT/ISA/210) mailed on Mar. 22, 2013, by the European Patent Office as the International Searching Authority for International Application No. PCT/EP2012/051695.
Written Opinion (PCT/ISA/237) mailed on Mar. 22, 2013, by the European Patent Office as the International Searching Authority for International Application No. PCT/EP2012/051695.
Apostolov A P, Requirements for automatic event analysis in substation automation systems, Power Engineering Society General Meeting, Piscataway, NJ, USA, Jun. 6, 2004, pp. 1-6.

(Continued)

*Primary Examiner* — Sai-Ming Chan
(74) *Attorney, Agent, or Firm* — Taft Stettinius & Hollister LLP

(57) ABSTRACT

Exemplary embodiments for updating a controller of a primary device of a power substation. An actual time is received from a time server via a cell phone communication network with a mobile device and the actual time is sent with the mobile device via a local wireless communication network to the controller.

20 Claims, 2 Drawing Sheets

(56) References Cited

OTHER PUBLICATIONS

Wai-Leung Cheung et al., WAP access to SCADA-typed database system, WSEAS Transactions on Computers, World Scientific and Engineering Academy and Society, vol. 2, No. 3, Jul. 1, 2003, pp. 560-565.
Liu Y et al., An IEC 61850 synchronised event logger for substation topology processing, Australian Journal of Electrical & Electronics Engineering, vol. 7, No. 3, Jan. 1, 2010, pp. 225-233.
Aug. 5, 2014 International Preliminary Report on Patentability issued in PCT/EP2012/051695.

* cited by examiner

UPDATING DATA OF A CONTROLLER OF A PRIMARY DEVICE OF A POWER SUBSTATION

RELATED APPLICATION(S)

This application is a continuation application under 35 U.S.C. §1.53 to International Application PCT/EP2012/051695 filed on Feb. 1, 2012, the entire content of which is hereby incorporated by reference.

FIELD

The disclosure relates to the field of monitoring of power substations. For example, the disclosure relates to a method, a computer program and a computer readable medium for updating data of a controller of a primary device of a power substation. The disclosure relates also to a mobile device and a system including such a mobile device.

BACKGROUND INFORMATION

Primary equipment or primary devices of a power substation, like relays, switches, breakers and transformers are in many instances connected to a controller (a secondary device) with a microprocessor that is adapted for controlling the respective primary device. For example, the controller of a protection relay can measure a current flowing through the relay and can open the relay, if a fault is detected.

For configuring the primary device or for diagnostic reasons, data should be read out of the controller or sent to the controller. For example, the controller can be connected via a station-bus to a central system like a supervisory control and data acquisition (SCADA) system or a station computer. Data of the primary device or the controller can be transferred via the station-bus to the SCADA system or the station computer. In some cases, the data can be directly read out via a PC and an additional service interface of the controller. For reading data, a tool specific to the controller of the primary device should be started to interpret fault recorder data or to set configuration parameters.

If the controller of the primary device has a real time clock, the real time clock from time to time should be synchronized with a global clock.

SUMMARY

An exemplary method for updating a controller of a primary device of a power substation is disclosed, the method comprising the steps: receiving an actual time ($t_g$) from a time server via a cell phone communication network with a mobile device; and sending, with the mobile device, the actual time ($t_g$) via a local wireless communication network to the controller.

An exemplary method for updating data from a controller of a primary device of a power substation is disclosed, the method comprising: receiving diagnostic data from the controller via a local wireless communication network, the diagnostic data having timestamps ($t_{ts}$) with respect to a local clock of the controller; receiving a local clock time ($t_l$) via the local wireless communication network from the controller; receiving an actual time ($t_g$) from a time server; and recalibrating the timestamps ($t_{ts}$) of the diagnostic data with respect to the local clock time (tl) and the actual time ($t_g$).

An exemplary mobile device is disclosed, comprising: a first communication unit for communicating via a local wireless communication network; a second communication unit for communicating via a cell phone communication network; wherein the mobile device is configured to perform the method of updating a controller of a primary device of a power substation, the method comprising the steps: receiving an actual time ($t_g$) from a time server via a cell phone communication network with a mobile device; and sending, with the mobile device, the actual time ($t_g$) via a local wireless communication network to the controller.

BRIEF DESCRIPTION OF THE DRAWINGS

The subject matter of the disclosure will be explained in more detail in the following text with reference to exemplary embodiments which are illustrated in the attached drawings.

In principle, identical parts are provided with the same reference symbols in the figures.

DETAILED DESCRIPTION

Figure 1:
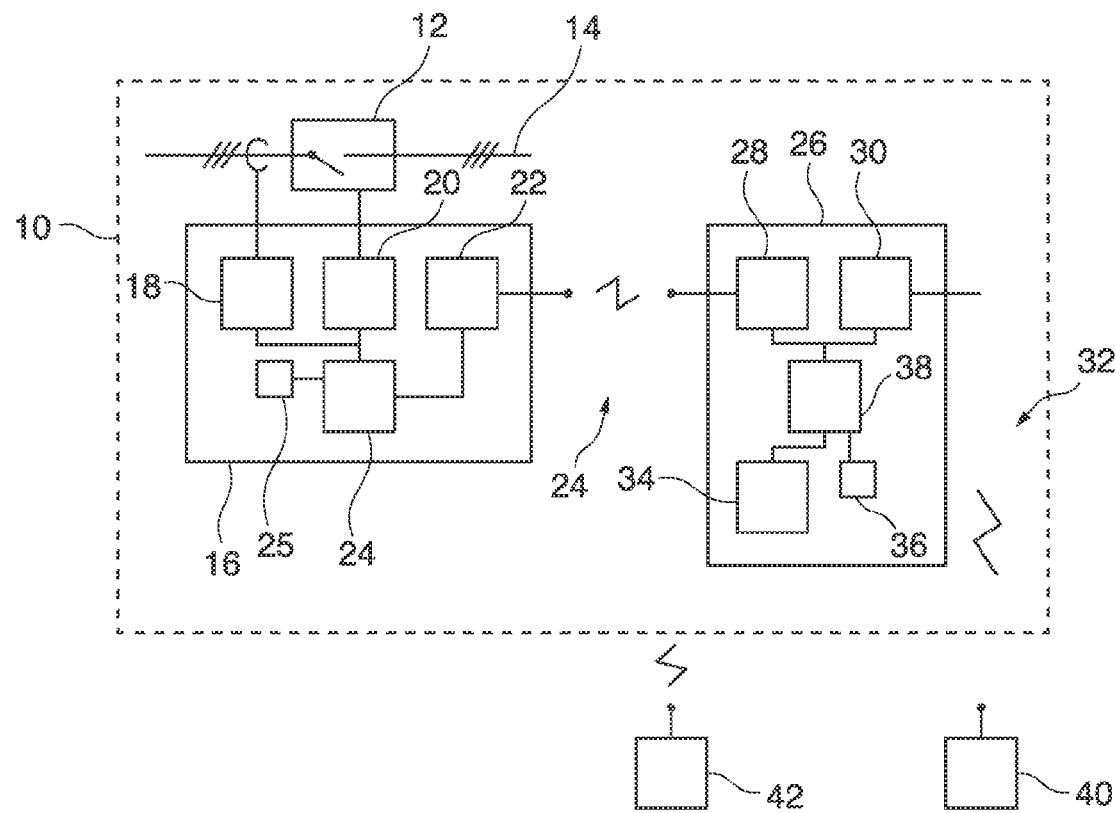
FIG. 1 schematically shows a power substation according to an embodiment of the disclosure.

Exemplary embodiments of the disclosure to simplify the configuration and the diagnostics of primary devices.

An exemplary embodiment of the disclosure relates to a method for updating a controller of a primary device of a power substation.

According to another exemplary embodiment of the disclosure, the method includes the steps of: receiving an actual time from a time server via a cell phone communication network with a mobile device; sending, with the mobile device, the actual time via a local wireless communication network to the controller.

The local clock of the controller can be updated with the actual time stored in a mobile device, for example a smartphone. The actual time can be updated in the mobile device via the cell phone communication network and can be updated in the controller via a local wireless communication link, like WLAN or BlueTooth. This can provide a simple way of keeping the clock time of the controller actual, even in the case, the internal clock is too fast or too slow. Furthermore, the controller need not be connected to a wired communication network, which can simplify the installation of the controller.

An exemplary embodiment of the disclosure relates to a method for updating data from a controller of a primary device of a power substation.

According to yet another exemplary embodiment of the disclosure, the method includes the steps of: receiving diagnostic data from the controller via a local wireless communication network, the diagnostic data having timestamps with respect to a local clock of the controller; receiving a local clock time via the local wireless communication network from the controller; receiving an actual time from a time server; recalibrating the timestamps of the diagnostic data with respect to the local clock time.

On the other hand, the mobile device can be used for receiving data from the controller. With the actual time that can be stored in the mobile device the timestamps of the data from the controller can be corrected in the case, the local clock of the controller is wrong.

An exemplary embodiment of the disclosure relates to a mobile device, for example a smartphone.

According to still another exemplary embodiment of the disclosure, the mobile device includes a first communication unit for communicating via a local wireless communication network and a second communication unit for communicating via a cell phone communication network. Furthermore, the mobile device is adapted for performing the method as described in the above and the following. The first communication unit can include a WLAN or a BlueTooth interface. The second communication unit can include a GSM or a UMTS interface.

Yet another exemplary embodiment of the disclosure relates to a system including such a mobile device and a controller for a primary device of a power substation having a communication unit for communicating via a local wireless network.

It has to be understood that features of the methods as described in the above and in the following can be features of the mobile device and the system as described in the above and in the following and vice versa.

Other exemplary embodiments of the disclosure relate to a computer program for updating data of a controller of a primary device of a power substation, which, when being executed by a processor, is adapted to carry out the steps of the method as described in the above and in the following, and a computer-readable medium, in which such a computer program is stored. For example, the method as described in the above and in the following is performed by an "app" e.g., application stored in a smartphone and optionally further software stored in the controller and a central system for receiving and sending data from and to the smartphone.

A computer-readable medium can be a floppy disk, a hard disk, a USB (Universal Serial Bus) storage device, a RAM (Random Access Memory), a ROM (Read Only memory), A FLASH and an EPROM (Erasable Programmable Read Only Memory). A computer readable medium can also be a data communication network, e.g. the Internet, which allows downloading a program code.

These and other aspects of the disclosure will be apparent from and elucidated with reference to the embodiments described hereinafter.

FIG. 1 schematically shows a power substation according to an embodiment of the disclosure. As shown in FIG. 1, the power substation 10 includes a high power primary device 12 coupled to high power lines 14 of the power substation 10.

The primary device 12, such as a protection relay, for example, which can be implemented as a high power switch, a breaker, an earth switch, a connector or a transformer, has a controller 16 for controlling the operation of the primary device 10. The controller 16 can be a device to be attached to or near the primary device 12 and can include a housing for accommodating all of its components.

The controller 16 can include a measurement unit 18 for measuring a current in the power lines 14, a control unit 20 for commanding the primary device 12 and a communication unit 22 for communication with external devices via a local wireless communication network 24, for example a radio communication network. The controller 16 can further include a CPU 24 with a processor and a storage for controlling the components 18, 20, 22 of the controller 18.

The controller 16 can further include a real time clock 25 that provides time values to the CPU 24.

The communication unit 22 can include a standard wireless communication interface (for example for BlueTooth, WLAN), which can replace a cable-bound interface. However, the communication unit 22 can also include additionally a cable-bound interface.

With the communication unit 22, an easy connection to a mobile device 26 can be established. The mobile device 26, which can be used and ported by a service technician, includes a first communication unit 28 for communicating via the communication network 24 and second communication unit 30 for communicating via a cell phone communication network 32. The mobile device can further include a HMI (human machine interface) 34, for example with a display and a keyboard, a real time clock 36 and a CPU 38 with a processor and a storage for controlling the components 28, 30, 34, 36 of the mobile device 26. For example, the mobile device 26 can be a smartphone or a standard laptop.

The local real time clock 36 of the mobile device 26 can be synchronized with the time of a time server 40 via the cell phone communication network 32. Usually, a service provider of a cell phone communication network 32 also provides a service with the actual time that can be used for setting the time of the clock 36 to the actual time of the time server 40.

Via the communication units 22, 28, data from the controller 18 can be transmitted to mobile device 26 and data from the mobile device 26 can be transmitted to the controller 18 without the need for a physical cable-bound connection. The mobile device 26 can be a standard device and the communication can be performed by using an "app" (application program, computer program) which can have been downloaded in advance from an App server via internet or GSM, for example via the communication interface 28 or via the communication interface 30. The computer program can also be a function running on a web-browser.

The "app" or computer program can have controller specific functions like fault recorder data reading, parameter setting and writing or fault finding. Fault finding can include calculating a fault location or place of incident by combining and/or evaluating several data records of a same time interval.

The functions of the mobile device and the computer program can be started, controlled and supervised with the HMI 34 by a service technician.

For example, the mobile device 26 can be used to synchronize the local real time clock 25 of the controller 16.

According to an exemplary embodiment of the disclosure, a mobile device 26, includes a first communication unit 28 for communicating via a local wireless communication network 24 and a second communication unit 30 for communicating via a cell phone communication network 32. The mobile device 26 is adapted for (e.g., configured to) exchanging data and synchronizing the time of the controller with its own time as described in the above and in the following.

According to an exemplary embodiment of the disclosure, the mobile device 26 is part of a system, which includes a controller 16 for a primary device 12 of a power substation 10 that has a communication unit 22 for communicating via a local wireless network 24.

Figure 2:
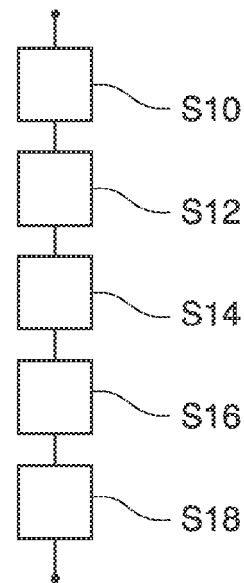
FIG. 2 shows a flow diagram for a method for updating data in a controller according to an embodiment of the disclosure.

FIG. 2 shows a flow diagram for a method for updating data in a controller according to an embodiment of the disclosure. The flow diagram illustrates a method for updating data in the controller 16 such as for setting or updating the clock 25.

In step S10, the actual time from the time server 40 is received in the mobile device 26 via the communication unit 30 and the clock 36 is set to the actual time by the CPU 38.

According to an exemplary embodiment of the disclosure, the method includes the step of: receiving an actual time from a time server 40 via a cell phone communication network 32 with a mobile device 26.

In step S12, which can be executed after a respective command of the service technician via the HMI 34, when the mobile device is in a communication range with respect to the controller 16, the actual time is sent to the controller 16.

It should be understood that step S10 can be automatically performed in regular time intervals and that steps S12 and the following steps can be performed only after a command from a service technician. However, also the synchronization of the clock 25 with the clock 36 and further functions can be triggered automatically, for example by the event, that the mobile device 26 enters the communication range to the controller 16.

For sending the actual time to the controller 16, the communication units 28, 32 establish a communication link and the CPU 24 receives in step S14 the actual time and sets the internal clock 25 to the received actual time.

According to an exemplary embodiment of the disclosure, the method includes the step of sending, with the mobile device 26, the actual time via a local wireless communication network 24 to the controller 16.

According to another exemplary embodiment of the disclosure, the method includes the step of synchronizing an internal clock 25 of the controller 16 with the actual time.

Even under the condition when the controller 16 is not connected via a substation bus or other wired communication line to a central system, an internal clock 25 or real time click 25 can be synchronized with a time from a mobile device 26 and therefore with a time from a time server 40 that provides a global actual time.

By time synchronizing the controller 16 of a primary device 12 to a time server 40, it can be easier to compare for example fault records on a time basis with fault records recorded by another controller of a further primary device and pertaining to the same fault (incidence). By using a smartphone together with above described application it can be possible to update the real time clock 25 of the controller 25 with the actual time. The smartphone can have the actual time from the timeserver 40, which can be located in a base station of a cell phone or internal GPS network. For example, the smartphone time and date can be continuously synchronized in every country.

In step S16, further configuration parameter can be sent to the controller 16. The wireless communication link can also be used for configuring the controller 16 with the mobile device 26 or for sending commands to the controller 16.

For example, the service technician can use a standard smartphone 26 for configuring the controller 16. Only an application with corresponding functions can have to be installed in the smartphone.

According to an exemplary embodiment of the disclosure, the method includes the step of sending, with the mobile device 26, configuration parameters to the controller 26 via the local communication network 24.

In step S18, the received actual time can be stored in the controller 16 by the CPU 24 for further reference. As will be explained in the following this time value can be used for recalibrating timestamped data from the controller 16, when the clock 25 is to slow or to fast with respect to the correct time of the time server 40. It has to be noted that all times and time values mentioned in the present disclosure can refer to date and time values.

According to an exemplary embodiment of the disclosure, the method includes the step of storing the received actual time in the controller 16 as clock update time $t_{up}$ for later reference.

Figure 3:
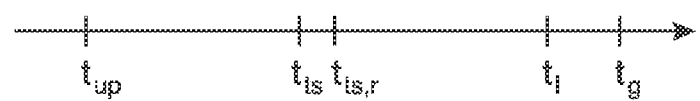
FIG. 3 shows a diagram describing the recalibration of timestamps according to an embodiment of the disclosure.
Figure 4:
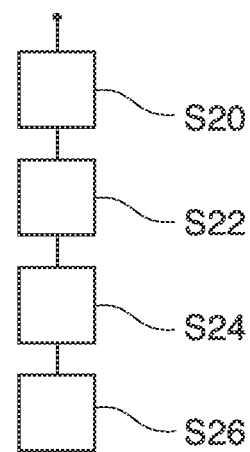
FIG. 4 shows a flow diagram for a method for updating data from a controller according to an embodiment of the disclosure.

The clock update time $t_{up}$ is shown in FIG. 3, which shows further time values that can be used in the methods as explained with respect to FIG. 2 and FIG. 4.

For example, when the clock 25 of the controller 16 has been synchronized with the clock 36 of the mobile device 26, the controller 16 has set the update time $t_{up}$ to the received actual time. After a while, for example a fault was detected by the controller 16 and a respective fault data record was generated and stored in the controller 16. This data record was timestamped with the local clock time of the fault event $t_{ts}$. Later, when the fault data record is downloaded from the controller 16 with the mobile device 26, the local clock time $t_l$ of the clock 25 differs from the global actual time $t_g$ of the clock 36 of the mobile device 26 because the local clock 25 is a bit slower or a bit faster than the correct actual time. From the timestamp time $t_{ts}$, a recalibrated timestamp time $t_{ts,r}$ can then be calculated.

FIG. 4 shows a flow diagram for a method for updating data from a controller according to an embodiment of the disclosure. The method illustrated in FIG. 4 is for updating data from the controller 16, in which timestamped data is recalibrated.

In step S20, a communication link 24 is established between the communication units 22, 28 and diagnostic data is sent from the controller 16 to the mobile device 26. For example, this can be triggered by a command of a service technician or automatically as explained above.

According to an exemplary embodiment of the disclosure, the method includes the step of receiving diagnostic data from the controller 16 via the local wireless communication network 24. The diagnostic data can have timestamps $t_{ts}$ with respect to a local clock 25 of the controller 16.

Diagnostic data can include fault data, measurement data from a sensor attached to the primary device 12, or in general other data related with the controller 16 and/or the primary device 12.

In step S22, the controller 16 also sends its local clock time $t_l$ to the mobile device 16.

According to another exemplary embodiment of the disclosure, the method includes the step of receiving a local clock time $t_l$ via the local wireless communication network 24 from the controller 16.

As already discussed, the actual time $t_g$ of the clock of the mobile device 36 can have been received from a time server 40.

In optional step S24, the diagnostic data, the local time and the actual time can be sent to a central system 24, for example a central monitoring system of the substation 10 or a SCADA system that can be remote from the substation 10. The diagnostic data and the time values $t_l$, $t_g$, $t_{up}$ can be sent via a communication link 24, e.g., with the local communication unit 28 (after the service technician and the mobile device have entered the communication range of the central system 42) or via the communication network 32.

In step S26, the timestamps of the diagnostic data are then recalibrated either in the mobile device 26 or in the central system 42.

According to still another exemplary embodiment of the disclosure, the method includes the step of recalibrating the timestamps $t_{ts}$ of the diagnostic data with respect to the local clock time $t_l$ and the actual time $t_g$.

According to an embodiment of the disclosure, the recalibrations can be performed by the mobile device 26.

According to another embodiment of the disclosure, the diagnostic data can be sent to a central system 42, wherein the recalibration is performed by the central system 42.

Under the assumption that the local clock 25 has a constant speed which slightly differs from the speed of the actual time, the recalibrated timestamps can be calculated in the following way:

$$t_{ts,r} = t_{up} + (t_{ts} - t_{up}) * (t_{gc} - t_{up}) / (t_{lc} - t_{up})$$

According to another exemplary embodiment of the disclosure, the method includes the steps of calculating an time offset between the local clock time $t_l$ and the actual time $t_g$ and recalibrating the timestamps $t_{ts}$ by changing a difference between a recalibrated timestamp time $t_{ts,r}$ and a timestamp time $t_{ts}$ proportional to a difference between the actual time $t_g$ and the local clock time $t_l$.

In the end, the local clock time of the clock 25 can be synchronized again with the actual time of the clock 36 as explained with respect to FIG. 2.

With the exemplary methods disclosed herein, it can be possible to calculate the actual inaccuracy of the real time clock 25. The clock 25 can be matched to the clock 36 by reading the local time and by comparing it with the actual time of the clock 36. Transmission delays can be neglected. By knowing the inaccuracy, and at the time of the upload of diagnostic data this can be a simple offset, the timestamps of for example uploaded fault records and events can be recalibrated to this offset. Through this, it can be possible to compare fault records from other controllers and primary devices, without a (permanently connected) time server 40.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for updating a controller of a primary device of a power substation, the method comprising the steps of:
   receiving an actual time ($t_g$) from a time server via a cell phone communication network with a mobile device; and
   sending, with the mobile device, the actual time ($t_g$) via a local wireless communication network to the controller.

2. The method of claim 1, comprising the step of:
   synchronizing an internal clock of the controller with the actual time ($t_g$).

3. The method of claim 1, comprising the step of:
   storing the actual time ($t_g$) in the controller as clock update time ($t_{up}$) for later reference.

4. The method of claim 2 comprising the step of:
   storing the actual time ($t_g$) in the controller as clock update time ($t_{up}$) for later reference.

5. The method of claim 1, comprising the step of:
   sending, with the mobile device, configuration parameters to the controller via the local communication network.

6. The method of claim 2, comprising the step of:
   sending, with the mobile device, configuration parameters to the controller via the local communication network.

7. The method of claim 3, comprising the step of:
   sending, with the mobile device, configuration parameters to the controller via the local communication network.

8. A method for updating data from a controller of a primary device of a power substation, the method comprising:
   receiving diagnostic data from the controller via a local wireless communication network, the diagnostic data having timestamps ($t_{ts}$) with respect to a local clock of the controller;
   receiving a local clock time ($t_l$) via the local wireless communication network from the controller;
   receiving an actual time ($t_g$) from a time server; and
   recalibrating the timestamps ($t_{ts}$) of the diagnostic data with respect to the local clock time (tl) and the actual time ($t_g$).

9. The method of claim 8, wherein the local clock time ($t_l$) has been updated by:
   receiving an actual time ($t_g$) from a time server via a cell phone communication network with a mobile device; and
   sending, with the mobile device, the actual time ($t_g$) via a local wireless communication network to the controller.

10. The method of claim 8, wherein the local clock time ($t_l$) has been updated by:
    receiving an actual time ($t_g$) from a time server via a cell phone communication network with a mobile device;
    sending, with the mobile device, the actual time ($t_g$) via a local wireless communication network to the controller and synchronizing an internal clock of the controller with the actual time ($t_g$).

11. The method of claim 8, comprising the steps:
    calculating an time offset between the local clock time ($t_l$) and the actual time ($t_g$);
    recalibrating the timestamps ($t_{ts}$) by changing a difference between a recalibrated timestamp time ($t_{ts,r}$) and a timestamp time ($t_{ts}$) proportional to a difference between the actual time ($t_g$) and the local clock time ($t_l$).

12. The method of claim 9, comprising the steps:
    calculating an time offset between the local clock time ($t_l$) and the actual time ($t_g$);
    recalibrating the timestamps ($t_{ts}$) by changing a difference between a recalibrated timestamp time ($t_{ts,r}$) and a timestamp time ($t_{ts}$) proportional to a difference between the actual time ($t_g$) and the local clock time ($t_l$).

13. The method of one of claim 8, wherein the recalibrations is performed by the mobile device.

14. The method of claim 8, comprising the step of:
    sending the diagnostic data to a central system, wherein the recalibration is performed by the central system.

15. A mobile device, comprising:
    a first communication unit for communicating via a local wireless communication network;
    a second communication unit for communicating via a cell phone communication network;
    wherein the mobile device is configured to perform the method of updating a controller of a primary device of a power substation, the method comprising the steps:
    receiving an actual time ($t_g$) from a time server via a cell phone communication network with a mobile device; and
    sending, with the mobile device, the actual time ($t_g$) via a local wireless communication network to the controller.

16. A system, comprising:
    a controller for a primary device of a power substation;
    a mobile device according to claim 10;
    wherein the controller has a communication unit for communicating via a local wireless network.

17. A non-transitory computer-readable medium, for storing a computer program for updating data of a controller of a primary device of a power substation, which, when the program is executed by a processor the processor is configured to execute the method of claim 1.

18. The non-transitory computer readable medium of claim 17, wherein the processor is configured to execute the step of:
    synchronizing an internal clock of the controller with the actual time ($t_g$).

19. The non-transitory computer readable medium of claim 18, wherein the processor is configured to execute the step of:
    storing the actual time ($t_g$) in the controller as clock update time ($t_{up}$) for later reference.

20. The non-transitory computer readable medium of claim 17, wherein the processor is configured to execute the step of:
    storing the actual time ($t_g$) in the controller as clock update time ($t_{up}$) for later reference.

* * * * *